(12) United States Patent
Anderson

(10) Patent No.: US 9,102,334 B2
(45) Date of Patent: Aug. 11, 2015

(54) METHODS AND APPARATUS TO CONTROL MOTORS

(71) Applicant: Deere & Company, Moline, IL (US)

(72) Inventor: Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 283 days.

(21) Appl. No.: 13/663,441

(22) Filed: Oct. 29, 2012

(65) Prior Publication Data

US 2014/0121865 A1     May 1, 2014

(51) Int. Cl.
*B60W 50/029*     (2012.01)
*B60W 50/14*     (2012.01)
(Continued)

(52) U.S. Cl.
CPC ............ *B60W 50/029* (2013.01); *B60W 10/06* (2013.01); *B60W 10/08* (2013.01); *B60W 20/00* (2013.01); *B60W 20/104* (2013.01); *B60W 20/40* (2013.01); *B60W 50/14* (2013.01); *F02N 11/0822* (2013.01); *F02N 11/0825* (2013.01); *F02N 11/108* (2013.01); *B60W 2050/0295* (2013.01); *B60W 2050/143* (2013.01); *B60W 2550/402* (2013.01); *F02N 2200/12* (2013.01); *F02N 2200/14* (2013.01); *Y02T 10/48* (2013.01); *Y02T 10/6291* (2013.01)

(58) Field of Classification Search
CPC ........... G06F 1/04; G06F 1/3203; G06F 9/00; G06F 7/00; B60W 50/029; B60W 50/14; B60W 10/06; B60W 10/08; B60W 20/00; B60W 20/40; B60W 20/104; B60W 2050/0295; B60W 2050/143; B60W 2050/402; F02N 11/0825; F02N 11/108; F02N 11/0822; F02N 2200/12; F02N 2200/14; Y02T 10/6291; Y02T 10/48

USPC .......................................................... 701/22
See application file for complete search history.

(56) References Cited

U.S. PATENT DOCUMENTS

| 1,269,637 | A | 6/1918 | Olmsted |
| 1,287,266 | A | 12/1918 | Eberly |

(Continued)

FOREIGN PATENT DOCUMENTS

| CN | 1410665 | | 4/2003 |
| CN | 1986304 | A | 6/2007 |

(Continued)

OTHER PUBLICATIONS

"Amendment to claims Mar. 31, 2015"; Amendment to claims Mar. 31, 2015.pdf; authored by Michael W. Zimmerman; recieved on Mar. 31, 2015.*

(Continued)

*Primary Examiner* — James Trammell
*Assistant Examiner* — James E Stroud
(74) *Attorney, Agent, or Firm* — Hanley, Flight & Zimmerman, LLC.

(57) ABSTRACT

Methods and apparatus are disclosed for identifying media and, more particularly, to methods and apparatus for decoding identifiers after broadcast. An example method includes determining a machine operation path that a machine is planned to follow, determining a projected component health parameter of a first motor of the machine based on the machine following the machine operation path, comparing the projected component health parameter to a first threshold, and issuing an alert when the projected component health parameter meets the first threshold.

24 Claims, 5 Drawing Sheets

(51) Int. Cl.
    *B60W 10/06*    (2006.01)
    *B60W 10/08*    (2006.01)
    *B60W 20/00*    (2006.01)
    *F02N 11/08*    (2006.01)
    *F02N 11/10*    (2006.01)

(56) References Cited

U.S. PATENT DOCUMENTS

| | | |
|---|---|---|
| 4,022,164 A | 5/1977 | Fuchs |
| 4,192,279 A | 3/1980 | Maisch et al. |
| 4,286,683 A | 9/1981 | Zeigner et al. |
| 4,362,133 A | 12/1982 | Malik |
| 4,364,343 A | 12/1982 | Malik |
| 4,421,075 A | 12/1983 | Mandel |
| 4,454,843 A | 6/1984 | Uchida et al. |
| 4,466,392 A | 8/1984 | Uchida et al. |
| 4,494,497 A | 1/1985 | Uchida et al. |
| 4,497,291 A | 2/1985 | Hamano et al. |
| 4,510,396 A | 4/1985 | Uchida et al. |
| 4,534,326 A | 8/1985 | Bowcott |
| 5,072,703 A | 12/1991 | Sutton |
| 5,349,931 A | 9/1994 | Gottlieb et al. |
| 5,619,412 A | 4/1997 | Hapka |
| 5,826,671 A | 10/1998 | Nakae et al. |
| 6,170,452 B1 | 1/2001 | Wisinski |
| 6,190,284 B1 | 2/2001 | Kuroda et al. |
| 6,218,804 B1 | 4/2001 | Toriyama et al. |
| 6,275,759 B1 | 8/2001 | Nakajima et al. |
| 6,308,129 B1 | 10/2001 | Uchida |
| 6,351,703 B1 | 2/2002 | Avery, Jr. |
| 6,363,906 B1 | 4/2002 | Thompson et al. |
| 6,371,889 B1 | 4/2002 | Kuroda et al. |
| 6,504,259 B1 | 1/2003 | Kuroda et al. |
| 6,532,926 B1 | 3/2003 | Kuroda et al. |
| 6,540,644 B2 | 4/2003 | Morimoto et al. |
| 6,556,910 B2 | 4/2003 | Suzuki et al. |
| 6,564,765 B2 | 5/2003 | Kuroda et al. |
| 6,595,180 B2 | 7/2003 | Thompson et al. |
| 6,629,515 B1 | 10/2003 | Yamamoto et al. |
| 6,679,214 B2 | 1/2004 | Kobayashi et al. |
| 6,729,988 B2 | 5/2004 | Katou et al. |
| 6,730,000 B1 | 5/2004 | Leising et al. |
| 6,763,903 B2 | 7/2004 | Morimoto et al. |
| 6,817,329 B2 | 11/2004 | Buglione et al. |
| 6,836,718 B2 | 12/2004 | Hasfjord et al. |
| 6,877,576 B2 | 4/2005 | Wilton et al. |
| 6,889,762 B2 | 5/2005 | Zeigler et al. |
| 6,895,917 B2 | 5/2005 | Itoh et al. |
| 6,928,972 B2 | 8/2005 | Biess et al. |
| 6,945,207 B2 | 9/2005 | Biess et al. |
| 7,003,395 B1 | 2/2006 | Thompson et al. |
| 7,036,477 B1 | 5/2006 | Thompson et al. |
| 7,066,128 B2 | 6/2006 | Satake et al. |
| 7,076,963 B2 | 7/2006 | Higashiyama |
| 7,080,617 B2 | 7/2006 | You |
| 7,082,914 B2 | 8/2006 | You |
| 7,091,629 B2 | 8/2006 | Hawkins |
| 7,098,549 B2 | 8/2006 | Asakage et al. |
| 7,100,558 B2 | 9/2006 | Amanuma et al. |
| 7,146,959 B2 | 12/2006 | Thompson et al. |
| 7,171,300 B1 | 1/2007 | Anderson |
| 7,247,123 B2 | 7/2007 | Ohtake et al. |
| 7,269,499 B2 | 9/2007 | Murakami et al. |
| 7,287,583 B2 | 10/2007 | Iwanami et al. |
| 7,310,576 B1 | 12/2007 | Letang |
| 7,347,175 B2 | 3/2008 | Lupo et al. |
| 7,454,922 B2 | 11/2008 | Zeigler et al. |
| 7,481,194 B2 | 1/2009 | Celisse et al. |
| 7,497,195 B2 | 3/2009 | Umezu et al. |
| 7,500,458 B2 | 3/2009 | Juenemann et al. |
| 7,501,791 B2 | 3/2009 | Thimm et al. |
| 7,558,666 B2 | 7/2009 | DiGonis |
| 7,562,698 B2 | 7/2009 | Fujiki et al. |
| 7,591,143 B2 | 9/2009 | Zeigler et al. |
| 7,591,303 B2 | 9/2009 | Zeigler et al. |
| 7,610,143 B1 | 10/2009 | Boesch |
| 7,617,692 B2 | 11/2009 | Dage et al. |
| 7,657,350 B2 | 2/2010 | Moran |
| 7,657,351 B2 | 2/2010 | Moran |
| 7,680,568 B2 | 3/2010 | Moran |
| 7,681,546 B2 | 3/2010 | Lecole et al. |
| 7,689,330 B2 | 3/2010 | Moran |
| 7,689,331 B2 | 3/2010 | Moran |
| 7,779,616 B2 | 8/2010 | Sheidler et al. |
| 7,793,856 B2 | 9/2010 | Hernandez et al. |
| 7,797,099 B2 | 9/2010 | Terada |
| 7,797,958 B2 | 9/2010 | Alston et al. |
| 7,801,672 B2 | 9/2010 | Ueda |
| 7,827,975 B1 | 11/2010 | Gibson et al. |
| 7,861,683 B2 * | 1/2011 | Saitoh et al. ............... 123/179.4 |
| 7,869,932 B2 | 1/2011 | Boesch |
| 7,890,243 B2 | 2/2011 | Abendroth |
| 7,975,539 B2 | 7/2011 | Laubender |
| 7,986,055 B2 | 7/2011 | Owens |
| 7,988,592 B2 | 8/2011 | Choi |
| 8,011,233 B2 | 9/2011 | Lee |
| 8,030,880 B2 | 10/2011 | Alston et al. |
| 8,109,136 B2 | 2/2012 | Moessner |
| 2002/0019687 A1 | 2/2002 | Suzuki et al. |
| 2002/0107632 A1 | 8/2002 | Fuse et al. |
| 2002/0188387 A1 | 12/2002 | Woestman et al. |
| 2003/0045988 A1 | 3/2003 | Suzuki et al. |
| 2003/0087724 A1 | 5/2003 | Seibertz et al. |
| 2006/0149519 A1 | 7/2006 | Keller |
| 2007/0124037 A1 | 5/2007 | Moran |
| 2009/0024265 A1 | 1/2009 | Kortschak et al. |
| 2009/0115419 A1 | 5/2009 | Ueda et al. |
| 2009/0241884 A1 | 10/2009 | Saitoh et al. |
| 2009/0254240 A1 | 10/2009 | Olsen, III et al. |
| 2009/0314255 A1 | 12/2009 | Boesch |
| 2010/0031911 A1 | 2/2010 | Gessier |
| 2010/0059007 A1 | 3/2010 | Senda et al. |
| 2010/0095689 A1 | 4/2010 | Shiroyama et al. |
| 2010/0100306 A1 | 4/2010 | Gamache et al. |
| 2010/0145562 A1 | 6/2010 | Moran |
| 2010/0174460 A1 | 7/2010 | Gibson et al. |
| 2010/0174473 A1 | 7/2010 | Pursifull et al. |
| 2010/0184562 A1 | 7/2010 | Senda et al. |
| 2010/0211288 A1 | 8/2010 | Gibson et al. |
| 2010/0222973 A1 | 9/2010 | Senda et al. |
| 2010/0250105 A1 | 9/2010 | Nagatsuyu et al. |
| 2010/0251852 A1 | 10/2010 | Murata et al. |
| 2010/0269776 A1 | 10/2010 | Mizuno |
| 2010/0286868 A1 | 11/2010 | Ehara et al. |
| 2010/0300404 A1 | 12/2010 | Gibson et al. |
| 2010/0300414 A1 | 12/2010 | Pursifull et al. |
| 2010/0305838 A1 | 12/2010 | Yamamura et al. |
| 2010/0324800 A1 | 12/2010 | Hanft et al. |
| 2011/0005486 A1 | 1/2011 | Nakamura |
| 2011/0017165 A1 | 1/2011 | Osawa et al. |
| 2011/0039657 A1 | 2/2011 | Gibson et al. |
| 2011/0049880 A1 | 3/2011 | Watanabe et al. |
| 2011/0071740 A1 | 3/2011 | Nihei et al. |
| 2011/0077828 A1 | 3/2011 | Matsuda et al. |
| 2011/0082621 A1 * | 4/2011 | Berkobin et al. ............... 701/33 |
| 2011/0088647 A1 | 4/2011 | Weiss et al. |
| 2011/0132308 A1 | 6/2011 | Liu et al. |
| 2011/0172900 A1 | 7/2011 | Mukaihara et al. |
| 2011/0180031 A1 | 7/2011 | Hamane |
| 2011/0192374 A1 | 8/2011 | Ulrey et al. |
| 2011/0208411 A1 | 8/2011 | Tsuji et al. |
| 2011/0213525 A1 | 9/2011 | Kanemoto et al. |
| 2011/0239645 A1 | 10/2011 | Nagoshi et al. |
| 2011/0245036 A1 | 10/2011 | Lochocki, Jr., Jr. et al. |
| 2011/0256980 A1 | 10/2011 | Saito et al. |
| 2011/0256981 A1 | 10/2011 | Saito et al. |
| 2011/0264359 A1 | 10/2011 | Lent |
| 2011/0266865 A1 | 11/2011 | Okabe et al. |
| 2011/0276209 A1 | 11/2011 | Suganuma et al. |
| 2011/0295474 A1 | 12/2011 | Ma et al. |
| 2011/0308490 A1 | 12/2011 | Hartmann et al. |

(56) References Cited

U.S. PATENT DOCUMENTS

| | | |
|---|---|---|
| 2012/0167555 A1 | 7/2012 | Frazier |
| 2012/0197468 A1 | 8/2012 | Frederick et al. |
| 2012/0310462 A1* | 12/2012 | Kuroda et al. .................. 701/22 |

FOREIGN PATENT DOCUMENTS

| | | | |
|---|---|---|---|
| CN | 1986307 | A | 6/2007 |
| CN | 1986308 | A | 6/2007 |
| CN | 101480916 | A | 7/2009 |
| CN | 101480948 | A | 7/2009 |
| CN | 101571075 | A | 11/2009 |
| CN | 101846024 | A | 9/2010 |
| EP | 1077149 | A2 | 2/2001 |
| EP | 1177928 | | 2/2002 |
| EP | 1256476 | | 11/2002 |
| EP | 1344673 | A2 | 9/2003 |
| EP | 1052400 | B1 | 10/2004 |
| EP | 1077149 | B1 | 9/2005 |
| EP | 1288491 | B1 | 3/2006 |
| EP | 1348895 | B1 | 7/2008 |
| EP | 1571315 | B1 | 10/2008 |
| EP | 1770266 | B1 | 1/2010 |
| EP | 2221226 | A1 | 8/2010 |
| EP | 1903199 | B1 | 10/2010 |
| EP | 1985481 | B1 | 12/2010 |
| EP | 2280162 | A1 | 2/2011 |
| EP | 2317100 | A1 | 5/2011 |
| EP | 2301817 | B1 | 10/2011 |
| KR | 2001061217 | A | 7/2001 |
| KR | 2003031074 | A | 4/2003 |
| KR | 2009109366 | A | 10/2009 |
| KR | 2009120392 | A | 11/2009 |
| KR | 930508 | B1 | 12/2009 |
| KR | 2009128839 | A | 12/2009 |
| KR | 2010043977 | A | 4/2010 |
| KR | 2010059021 | A | 6/2010 |
| KR | 2010110416 | A | 10/2010 |
| KR | 2010131737 | A | 12/2010 |
| WO | 2007112233 | A2 | 10/2007 |
| WO | 2009150909 | A1 | 12/2009 |
| WO | WO 2011122243 | A1 * | 10/2011 |

OTHER PUBLICATIONS

International Searching Authority, "International Search Report and Written Opinion," issued in connection with application No. PCT/US2013/027783, mailed on Jul. 24, 2013, (12 pages).

"The Start/Stop System", Robert Bosch GmbH, <<http://rb-kwin.bosch.com/en/powerconsumptionemissions/gasolinesystems/startstopfunction/startstopsystem.html>>, Retrieved on Nov. 1, 2012, 1 page.

"digital power for the next generation of mobile devices", CAP-XX, <<http://www.cap-xx.com/rethink/resources/faq.htm>>, Retrieved on Nov. 1, 2012, 4 pages.

"Lifetime temperature and voltage derating", <<http://www.garman-age.com/atlier/index/cgi?path=public&B&Energy_storage/Aging/Derating>>, Retrieved on Nov. 1, 2012, 5 pages.

"Engine Start Module—Application Specific Modules", Maxwell Technologies, Products—Ultracapacitors, <<http://www.maxwell.com/products/ultracapacitors/products/engine-start-module>>, Retrieved on Nov. 1, 2012, 3 pages.

Glenn Alber and Bob Leissle, "Battery Monitoring: Why Not Do It Right?", Albercorp, Boca Raton, Florida, <<http://www.albercom/Docs/MonRight0999.pdf>>, 1998-1999, 8 pages.

Ultracapacitors Help P21 to Provide Fuel Cell-Based Backup Power for Telecoms, Maxwell Technologies, Inc. and Maxwell Technologies SA, Case Study, <<http://www.maxwell.com/preoducts/ultracapacitors/docs/p21_casestudy.pdf>>, Retrieved on Nov. 1, 2012, 8 pages.

* cited by examiner

METHODS AND APPARATUS TO CONTROL MOTORS

FIELD OF THE DISCLOSURE

This disclosure relates generally to machines with motors, and, more particularly, to methods and apparatus to control motors.

BACKGROUND OF THE DISCLOSURE

In machines, such as vehicles, a motor may be automatically stopped and later restarted during a running operation. For example, in a hybrid vehicle that has a combustion engine and an electric motor, the combustion engine is automatically stopped when the hybrid vehicle determines that power should be supplied solely by the electric motor. When the hybrid vehicle determines that power should again be alternatively or additionally supplied the combustion engine, the hybrid vehicle causes the combustion engine to be restarted. In another example, a vehicle may automatically stop a combustion engine when no motor power is required (e.g., when the vehicle is stopped at a stop light, when the vehicle is coasting downhill, etc.).

The frequent motor start/stop cycles that result from automatically stopping the motor of a machine, results in additional wear and tear on components of the machine. For example, the starter motor will receive additional wear as compared with a machine in which the motor is not automatically stopped. Furthermore, the frequent restarting increases the likelihood that a component failure will prevent the motor from being restarted.

SUMMARY

According to an example embodiment of the present disclosure, a method includes determining a machine operation path that a machine is planned to follow and a projected component health parameter of a first motor of the machine based on the machine following the machine operation path. The method further includes comparing the projected component health parameter to a first threshold and issuing an alert when the projected component health parameter meets the first threshold.

According to another example embodiment of the present disclosure, an apparatus includes a path monitor to determine a machine operation path that a machine is planned to follow. The apparatus also includes a start/stop inhibit controller to determine a projected component health parameter of a first motor of the machine based on the machine following the machine operation path, compare the projected component health parameter to a first threshold, and issue an alert when the projected component health parameter meets the first threshold.

According to another example embodiment of the present disclosure, a tangible computer readable storage medium includes instructions that, when executed, cause a machine to determine a machine operation path that a machine is planned to follow and a projected component health parameter of a first motor of the machine based on the machine following the machine operation path. The instructions, when executed, also cause the machine to compare the projected component health parameter to a first threshold and issue an alert when the projected component health parameter meets the first threshold.

DETAILED DESCRIPTION

Example methods and apparatus described herein determine when a machine is likely to experience a failure restarting a motor (e.g., in a machine that automatically stops and starts the motor during operation). When a failure is determined to be likely, an alert may be provided and/or the machine may be prevented from automatically stopping the motor. As described in detail herein, failure may be determined to be likely when a component health parameter meets a threshold. The component health parameter may be determined taking into account information about a path to be followed by the machine and characteristics of the path (e.g., stop signs, stop lights, material pickup locations, etc.), current and/or forecasted weather conditions, etc.

Figure 1:
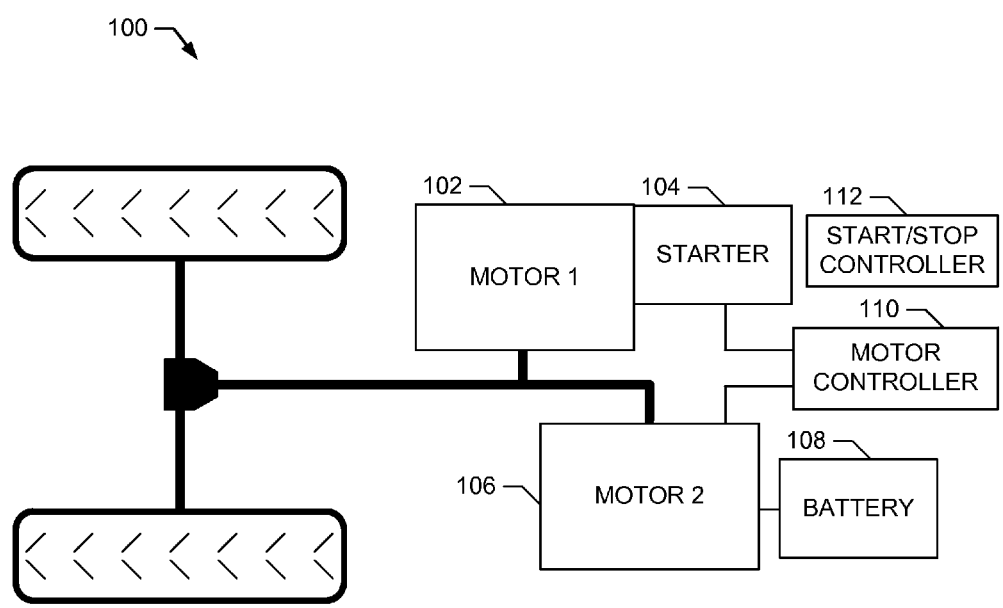
FIG. 1 is a block diagram of an example dual motor control system.

FIG. 1 is a block diagram of an example dual motor control system 100 of a vehicle. The example dual motor control system 100 includes a first motor 102, a starter 104, a second motor 106, a battery 108, a motor controller 110, and a start/stop controller 112. The example dual motor control system 100 is a hybrid control system wherein the first motor 102 is a combustion engine and the second motor 106 is an electric motor powered by the battery 108. Additionally, a generator may be powered by the first motor 102 to provide electrical energy to the second motor 106 and the battery 108.

The motor controller 110 of the illustrated example controls the operation of the first motor 102, the starter 104, and the second motor 106 to efficiently drive the vehicle. For example, when the vehicle is started (e.g., by an ignition switch) and an accelerator is pressed, the motor controller 110 controls the second motor 106 to propel the vehicle. When additional power is desired (e.g., then when vehicle starts to climb a hill or the accelerator is pressed to request speed or acceleration that exceeds the power of the second motor 106), the motor controller 110 signals the starter 104 to start the first motor 102 and additionally or alternatively drives the vehicle by the first motor 102. When the additional power is no longer desired, the motor controller 110 automatically stops the first motor 102 to conserve fuel and drive the vehicle by the second motor 106. The battery 108 may be charged when the vehicle is coasting (e.g., downhill), when the vehicle is braking, when plugged into a power source, etc.

The start/stop controller 112 of the illustrated example is communicatively and/or mechanically coupled with the components of the vehicle to inhibit the motor controller 110 from automatically stopping the first motor 102 when the start/stop controller 112 determines that the motor controller 110 may be unable to restart the first motor 102 at a later time. For example, when the start/stop controller 112 determines that the health of one or more components of the vehicle (e.g., the starter 104) is degraded to the point that the starter may be unable to start the first motor 102 when requested, the start/ stop controller 112 causes an alert to be presented and/or inhibits the motor controller 110 from automatically stopping the first motor 102.

Figure 2:
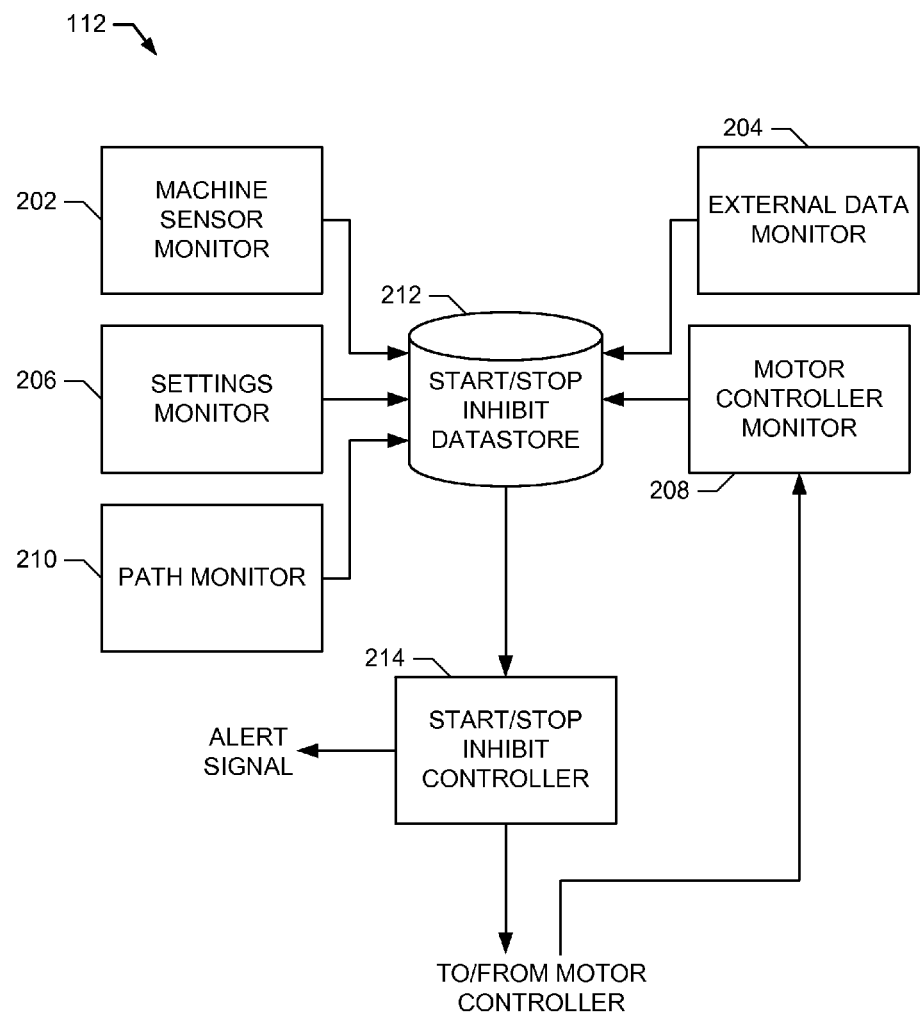
FIG. 2 is a block diagram of an example implementation of the start/stop controller of FIG. 1
Figure 3:
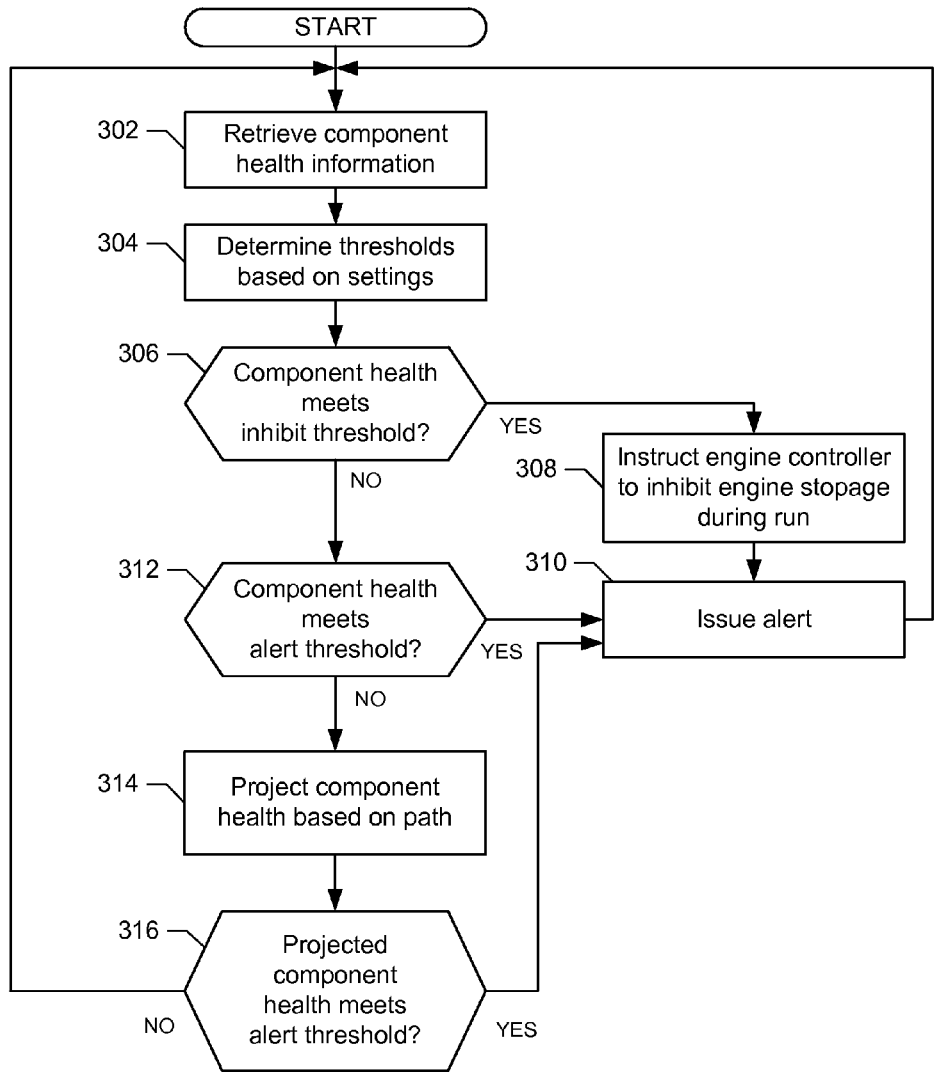
FIG. 3 is a flowchart of an example process, which may be implemented using executable machine readable instructions to implement the start/stop inhibit controller of FIG. 2.
Figure 4:
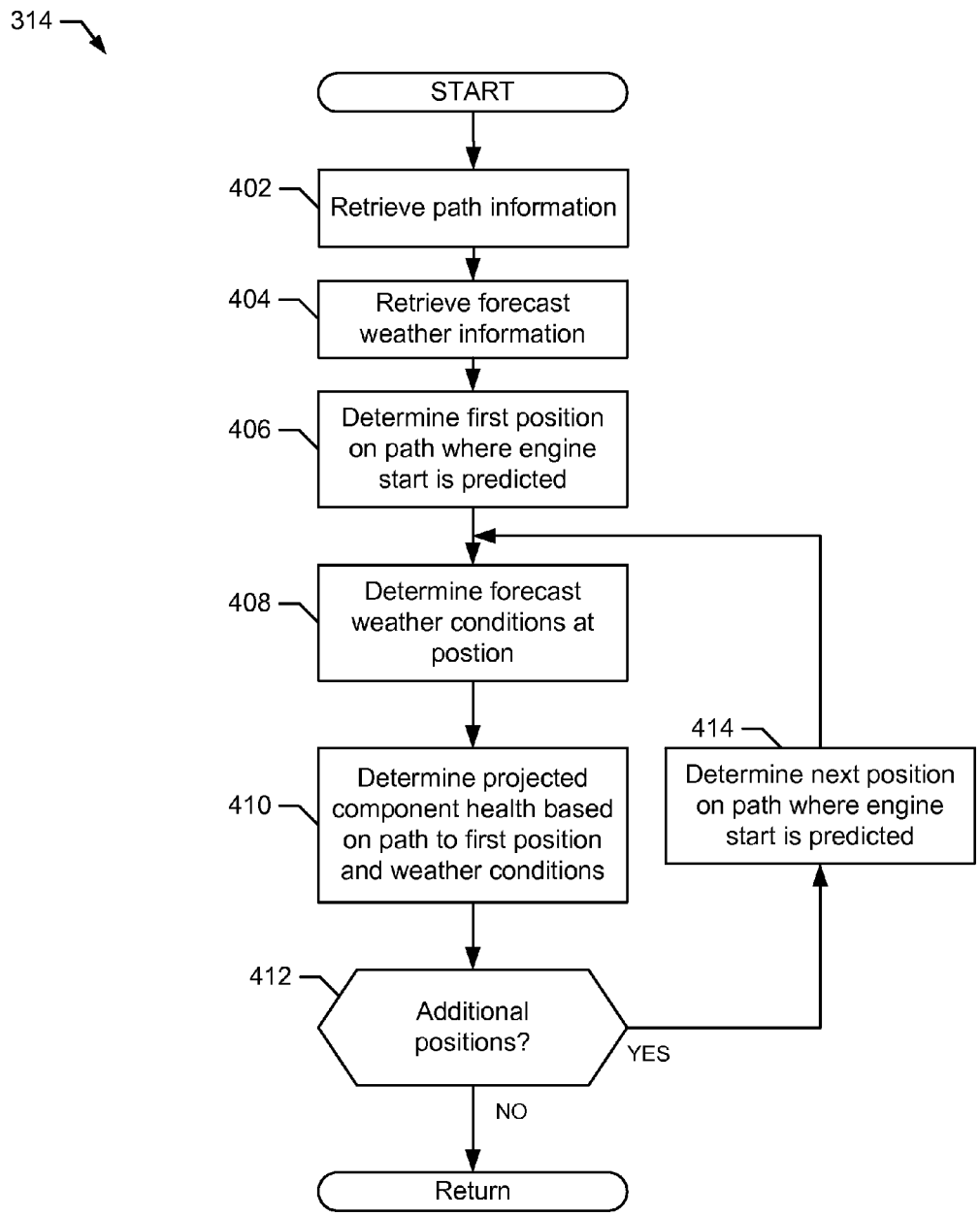
FIG. 4 is a flowchart of an example process, which may be implemented using executable machine readable instructions to project component health parameters based on a received plan.

Example implementations and processes to implement the start/stop controller 112 are described in further detail in conjunction with FIGS. 2-4.

FIG. 2 is a block diagram of an example implementation of the start/stop controller 112 of FIG. 1. The example start/stop controller 112 of FIG. 2 includes a machine sensor monitor 202, an external data monitor 204, a settings monitor 206, a motor controller monitor 208, a path monitor 210, a start/stop inhibit datastore 212, and a start/stop inhibit controller 214. The example start/stop controller 112 is communicatively and/or mechanically coupled with a motor controller of the machine to enable the motor controller monitor 208 to receive motor operation information from the motor controller and to enable to start/stop inhibit controller 214 to inhibit automatic stoppage of the motor. Some or all of the components of the start/stop controller 112 may be located at the machine, may be integrated with the motor controller, and/or may be located outside of the machine (e.g., at a control system or control facility communicatively coupled with the machine). The machine may be a car, a truck, a tractor, a utility vehicle, an excavating machine, or any other type of machine having at least one motor.

The machine sensor monitor 202 monitors sensors of the machine to collect data for storage in the start/stop inhibit datastore 212. The machine sensor monitor 202 may monitor any sensors that provide data indicative of the health of components used in the starting of the motor. For example, the machine sensor monitor 202 may monitor a battery, a starter capacitor, a starter, a starter solenoid, a crankshaft, spark plugs, fuel injectors, valves, cylinders, etc. The machine sensor monitor 202 may determine the battery and/or starter capacitor state of charge, current draw of the starter and/or starter solenoid, motor temperature, fluid temperatures, noise and/or thermal cycles in electronics associated with starter components, crankshaft position, spark plug operation, etc. The machine sensor monitor 202 may also track for one or more components an age, number of times operated (e.g., number of times a particular component is operated), etc. The data collected by the machine sensor monitor 202 is stored in start/stop inhibit datastore 212 for analysis by the start/stop inhibit controller 214.

The external data monitor 204 monitors and/or retrieves external data that is to be used by the start/stop inhibit controller 214. The external data monitor 204 of the illustrated example can receive weather forecast information from at least one of an internet content provider, a management facility (e.g., a farm or construction management facility), a computer used by the machine owner, radio broadcasts, or any other source. The weather forecast information may include past, current, and forecasted temperature reports; past, current, and forecasted precipitation reports; past, current, and forecasted humidity reports; past, current, and forecasted wind reports; and so forth. The external data monitor 204 may additional or alternatively obtain any other information to be used by the start/stop inhibit controller 214 such as information about maintenance performed on the machine, advisories of maintenance suggested or required for the machine (e.g., from the machine manufacturer), updated information for analyzing the machine sensors, maintenance cost information, etc. The external data monitor 204 stores collected data in the start/stop inhibit datastore 212.

The settings monitor 206 monitors and/or receives settings information from a user of the machine. The setting information allows a user to make changes to the operation of the start/stop inhibit controller 214. For example, the settings information may include a setting indicating how aggressively the start/stop inhibit controller 214 should provide alerts and/or inhibit automatic stoppage of the motor. When the settings monitor 206 receives an indication that the setting should be high, the start/stop inhibit controller 214 may set thresholds such that alerts and inhibiting is performed earlier in the health of the motor components. For example, a user might specify a high setting when the machine is operated in a remote location where service after a failure would be difficult or where reliable operation of the machine is critical. In some examples, rather than receiving settings that indicate a level, the settings information may include information about the availability of service parts, the geographic distribution of service parts, the mean time between failure of parts, the availability of service personnel, a cost of downtime, etc. and the start/stop inhibit controller 214 will determine how to set the thresholds based on the settings information. The settings information may also specify which sensors of the machine are to be monitored and/or which sensors should be ignored.

The motor controller monitor 208 of the illustrated example monitors data output by a motor controller of the machine. The motor controller monitor 208 tracks the number of times that the motor is started, the number of times that the motor is stopped, the amount of time that the motor is running, the time it takes to start the motor (e.g., from the time the starter is signaled to operate until the motor is running), etc. The motor controller monitor 208 stores collected data in the start/stop inhibit datastore 212.

The path monitor 210 receives and/or determines a planned path for operation of the machine. The path specifies a route that the machine will travel (e.g., a car driving between home and office, a tractor travelling to and/or throughout a field, construction equipment navigating a construction site, etc.). In addition to a sequence of locations, in some examples a path may include a sequence of actions tied to a schedule (e.g., a bus on a repeated route with stops), a sequence of events related to a task (e.g., a grain cart unloading grain at a bin or a loader waiting for the arrival of an empty dump truck, etc.), or any other information indicative of machine start/stop behavior. The path may additionally include information about the terrain of the route (e.g., the roughness of the terrain, one or more slopes of the route, an altitude of the route, crops planted on the route, etc.), places where a machine stops to pick up or transfer materials, stop signs, stop lights, traffic delays, etc. The path may additionally include information about the velocity at which the machine is scheduled to traverse the route, the time and/or date at which the path will be initiated, information about breaks or stops to be taken, etc. The path monitor 210 may receive the path from a path planning tool such as a navigation device (e.g., a global positioning system navigation device), path planning software executing on a computing device, etc. Additionally or alternatively, the path monitor 210 may determine a path from prior operation of the machine (e.g., may learn a path and schedule). The path information is stored in the start/stop inhibit datastore 212.

The start/stop inhibit datastore 212 stores data to be used by the start/stop inhibit controller 214 to determine if automatic stoppage of the motor of the machine is to be inhibited. For example, while a hybrid system would normally stop a combustion engine from operating in its normal course of operation with the goal being to conserve fuel, the start/stop inhibit controller 214 may inhibit the automatic stoppage of the engine based on various factors. The start/stop inhibit datastore 212 may comprise one or more of a database, a file, a data structure, an object datastore, a hard drive, a memory, a volatile memory, a nonvolatile memory, etc. While a single start/stop inhibit datastore 212 is shown in FIG. 2, the start/stop controller 112 may include any number of datastores (e.g., one datastore for each component of the start/stop controller 112).

The start/stop inhibit controller 214 processes the data stored in the start/stop inhibit datastore 212 to determine when to display an alert and/or to inhibit automatic stoppage of the motor of the machine. The start/stop inhibit controller 214 determines one or more component health parameters associated with the motor and compares the one or more component health parameters to one or more thresholds. When the one or more component health parameters meet the one or more thresholds, the start/stop inhibit controller 214 causes an alert to be displayed and/or inhibits automatic stoppage of the motor. The example start/stop inhibit controller 214 receives forecasted information (e.g., planned path, forecasted weather, etc.) and uses the forecasted information to project the component health parameters before comparing the projected component heath parameters to the one or more thresholds. Alerting and/or inhibiting of automatic stoppage of the motor based on the projected component health parameters may enable maintenance or repairs to be performed at a planned time and place rather than having an unplanned breakdown in a location that may make repairs difficult. For example, if a tractor were forecasted to be operating in a remote location, it would be desirable to be alerted to a likelihood of failure prior to leaving the home location of the tractor so that maintenance and/or repairs can be performed (i.e., rather than having a breakdown that forces repairs to be performed in the field). The analysis performed by the start/stop inhibit controller 214 is described in greater detail in conjunction with the flowcharts of FIGS. 3 and/or 4.

While an example manner of implementing the system start/stop controller 112 has been illustrated in FIG. 2, one or more of the elements, processes and/or devices illustrated in FIG. 2 may be combined, divided, re-arranged, omitted, eliminated and/or implemented in any other way. For example, another implementation of the start/stop controller 112 that does not utilize external data or settings data may include the example machine sensor monitor 202, the example path monitor 210, the example motor controller monitor 208, the example start/stop inhibit datastore 212, and the start/stop inhibit controller 214. In another example, the start/stop controller 112 may include the path monitor 210, the motor controller monitor 208, the start/stop inhibit datastore 212, and the start/stop inhibit controller 214. Alternatively, any other combination or subcombination of the components illustrated in FIG. 2 and other components may be utilized to implement the start/stop controller 112.

Further, the machine sensor monitor 202, the external data monitor 204, the settings monitor 206, a motor controller monitor 208, the path monitor 210, the start/stop inhibit datastore 212, and/or the start/stop inhibit controller 214 of FIG. 2 may be implemented by hardware, software, firmware and/or any combination of hardware, software and/or firmware. Thus, the machine sensor monitor 202, the external data monitor 204, the settings monitor 206, a motor controller monitor 208, the path monitor 210, the start/stop inhibit datastore 212, and/or the start/stop inhibit controller 214 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the machine sensor monitor 202, the external data monitor 204, the settings monitor 206, a motor controller monitor 208, the path monitor 210, the start/stop inhibit datastore 212, and/or the start/stop inhibit controller 214 are hereby expressly defined to include a tangible computer readable medium such as a memory, digital versatile disk (DVD), compact disk (CD), Blu-ray, etc. storing the software and/or firmware. Further still, the machine sensor monitor 202, the external data monitor 204, the settings monitor 206, a motor controller monitor 208, the path monitor 210, the start/stop inhibit datastore 212, and/or the start/stop inhibit controller 214 may include one or more elements, processes and/or devices in addition to, or instead of, those illustrated in FIG. 2, and/or may include more than one of any or all of the illustrated elements, processes and devices.

Flowcharts representative of processes that may be implemented using example machine readable instructions and/or hardware logic to carry out the functionality of the start/stop inhibit controller 214 are shown in FIGS. 3-4. In these examples, the machine readable instructions comprise a program for execution by a processor such as the processor 512 shown in the example processor platform 500 discussed below in connection with FIG. 5. The processes may be embodied in software stored on a tangible computer readable medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example processes are described with reference to the flowcharts illustrated in FIGS. 3-4, many other methods of implementing, the start/stop inhibit controller 214 may alternatively be used. For example, the order of execution of the blocks may be changed, and/or some of the blocks described may be changed, eliminated, or combined.

As mentioned above, the example processes of FIGS. 3-4 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 3-4 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 3 is a flowchart representative of a process that may be implemented using example machine readable instructions to carry out the functionality of the start/stop inhibit controller 214 of FIG. 2. The process of FIG. 3 begins when the start/stop inhibit controller 214 retrieves component health information from the start/stop inhibit datastore 212 (block 302). As described in conjunction with FIG. 2, the component health information may be stored in the start/stop inhibit datastore 212 by the machine sensor monitor 202 and/or the motor controller monitor 208. The component health information may include any information indicative of the health of components of the motor and its associated components (e.g., the motor starter system). The component health information may be a value associated with a component at a given time (e.g., a current charge level of a battery, an amount of time taken to start a motor during a previous cycle, etc.). Additionally or alternatively, the component health information may be a value that represents a period of time (e.g., a number of times that a starter has been operated, an age of a battery, an average time taken to start a motor during previous cycles, an average peak battery charge level, etc.).

The start/stop inhibit controller 214 then determines thresholds based on settings stored in the start/stop inhibit datastore 212 by the settings monitor 206 (block 304). Additionally or alternatively, the settings monitor 206 may determine the thresholds and transmit them to the start/stop inhibit controller 214. In some implementations, the settings specify warning threshold levels (e.g., low, medium, and high). For example, when a high warning threshold level is set, the start/stop inhibit datastore 212 may set thresholds such that alerts and/or inhibiting of automatic stoppage of the motor are performed earlier or more preemptively than the low warning threshold level. Additionally or alternatively, the threshold levels may be derived from settings related to the operation, location, maintenance availability, etc. of the machine. For example, a setting may indicate the distance and/or lead time of maintenance personnel, a criticality level (e.g., an emergency vehicle may have a higher criticality level than a recreational vehicle), a location, etc. Such settings may be analyzed by the settings monitor 206 and/or the start/stop inhibit controller 214 to determine one or more thresholds.

The settings monitor 206 and/or the start/stop inhibit controller 214 may determine or be configured with any number of thresholds. According to the illustrated example, a first set of thresholds, when met, trigger issuing of an alert and a second set of thresholds, when met, trigger inhibiting automatic stoppage of the motor. In such an example, the second set of thresholds is met later than the first set of thresholds. In other words, the first set of thresholds is at a lower level, thereby causing an alert to be issued sooner than automatic stoppage of the motor is inhibiting. The sets of thresholds may include a threshold associated with each of the component health parameters (e.g., a first threshold for a first component health parameter and a second threshold for a second component health parameter). Alternatively, where the start/stop inhibit controller 214 develops a composite health value representative of all analyzed component health parameters, a single threshold may be determined for each set.

After determining the thresholds, the start/stop inhibit controller 214 determines if the component health information meets a determined threshold for inhibiting automatic motor stoppage (block 306). For example, the start/stop inhibit controller 214 may determine if any component health parameter exceeds any of the associated thresholds. If any of the component health parameters exceeds the inhibit threshold, the start/stop inhibit controller 214 instructs the motor controller of the machine to inhibit automatic engine stoppage (block 308). In other words, the start/stop inhibit controller 214 instructs the motor controller not to automatically stop the motor when the machine is in the run mode (e.g., the ignition key is turned to run). While the start/stop inhibit controller 214 instructs the motor not to automatically stop the motor, the motor may still be stopped when the machine is changed to an inactive mode (e.g., turning the ignition key to off), when a safety issue is detected (e.g., a motor overheating), etc.

After inhibiting automatic engine stoppage (block 308), the stop/stop inhibit controller 214 issues an alert (block 310). The alert may be displayed a single time or may be repeated. The alert may be repeated upon the occurrence of events (e.g., each time that a new component health parameter meets a threshold, when the motor controller attempts to automatically stop the motor, when an operator attempts to move the machine to inactive mode (e.g., by turning off the ignition key), etc. The alert may be a displayed alert, an audible alert, a physical alert (e.g., a vibration), etc. The alert may be presented at the machine and/or may be transmitted remotely via a wired or wireless connection (e.g., the alert may be transmitted to a central management facility, to storage on the internet for retrieval by an operator of a machine, to a desktop computer of an operator of the machine, etc.). Control then returns to block 302 to continue monitoring the motor.

If the start/stop inhibit controller determines that the component health parameters do not meet the inhibit threshold (block 306), the start/stop inhibit controller 214 determines if the component health parameters meet an alert threshold (block 312). When the component health parameters meet the alert threshold (one or more component health parameters as described in conjunction with block 306), the stop/stop inhibit controller 214 issues an alert (block 310). Control then returns to block 302 to continue monitoring the motor.

If the start/stop inhibit controller 214 determines that the component health parameters do not meet the alert threshold (block 312), the start/stop inhibit controller 214 projects the component health parameters based on a path stored in the start/stop inhibit datastore 212 by the path monitor 210 (block 314). Projected component health parameters are a prediction or estimation of the value or status of the component health parameters during and at the end of completing the path. Accordingly, determining the projected component health parameters facilitates a determination of whether or not the motor is likely to fail to start while operating on the path. Example instructions that may be executed to project component health parameters are described in conjunction with FIG. 4.

The start/stop inhibit controller 214 determines if the projected component health parameters meet the alert threshold (block 316). When the projected component health parameters do not meet the alert threshold, control then returns to block 302 to continue monitoring the motor. When the projected component health parameters meet the alert threshold, the start/stop inhibit controller 214 issues an alert (block 310). Accordingly, an operator or manager of the machine can take action before the machine experiences a breakdown. For example, the operator or manager may perform maintenance, replace parts, disable automatic stoppage of the motor, utilize a different machine, wait until conditions change (e.g., a fluid temperature decreases), etc. Control then returns to block 302 to continue monitoring the motor.

According to FIG. 3, the start/stop inhibit controller 214 compares the projected component health parameters to the alert threshold to provide an alert that a likelihood of breakdown exceeds the threshold alert level. Additionally or alternatively, the start/stop inhibit controller 214 may compare the projected component health parameters to the inhibit threshold and indicate that automatic stoppage of the motor will be inhibited during the path.

FIG. 4 is a flowchart of a process that may be implemented using example machine readable instructions to project component health parameters based on a received plan (block 314 of FIG. 3). The instructions of FIG. 4 begin when the start/stop inhibit controller 214 retrieves path information from the start/stop inhibit datastore 212 (block 402). The example path information includes a route as well as information about the terrain, elevation, and speed at which the route will be completed. Alternatively, fewer details may be included and/or additional information may be included. The start/stop inhibit controller 214 retrieves forecast weather information stored in the start/stop inhibit datastore 212 by the external data monitor 204 (block 404). While the illustrated example includes forecast weather information, any information for forecasting or projecting component health parameters may be retrieved (e.g., information about crops to be harvested on the path, information about cargo and/or passengers to be carried by the machine, etc.).

The start/stop inhibit controller 214 then determines a first position on the path where the motor start is predicted (block 406). For example, the start/stop inhibit controller 214 may determine that the machine will travel downhill causing the motor to be stopped and, at the bottom of the hill, the motor will be restarted. In another example, the start/stop inhibit controller 214 may determine that the machine will be stopped to attach a trailer or other equipment and will then be restarted.

After determining a position at which the motor will be started, the start/stop inhibit controller 214 determines the forecast weather conditions at the position using the retrieved forecast weather information (block 408). For example, the start/stop inhibit controller 214 may determine a predicted temperature at the time at which the machine is expected to be at the determined position.

The start/stop inhibit controller 214 then determines projected component health parameters based on the path, the position, and the weather conditions (block 410). The start/stop inhibit controller 214 determines the projected component health parameters by estimating the parameters based on the machine completing the path up to the determined position. For example, a component health parameter related to the miles driven by the machine will be incremented based on the distance along the path to the determined position, a number of times that a starter is operated can be predicted by determining the number of times that the motor will need to be started along the path to the determined position, a battery charge level can be predicted by reducing the current battery charge level by the amount of battery usage along the path to the determined position, etc.

The start/stop inhibit controller 214 determines if there are additional positions at which the motor will be started along the path (block 412). When there are additional positions, the start/stop inhibit controller 214 determines the next position and control returns to block 408 to project the component health parameters related to the position. When there are no additional positions, control returns to block 316 of FIG. 3 to compare the projected component health parameters to alert thresholds.

According to the example of FIG. 4, the projected component health parameter are determined for the entire path by determining the parameter changes due to each segment (between positions) and combining the changes to determine projected component health parameters after the entire path is completed. Alternatively, the only position to be analyzed may be the end of the path and the projected component health parameters may be determined by analyzing the change to component health parameters due to performing the entire path.

Figure 5:
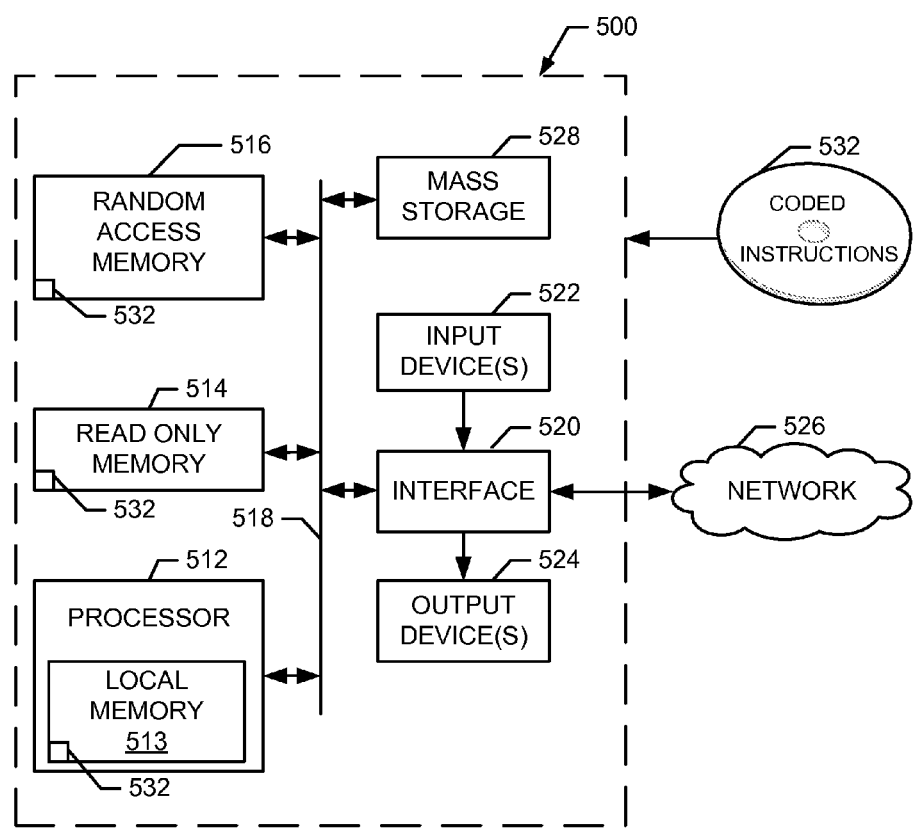
FIG. 5 is a block diagram of an example processing system that may execute example machine readable instructions to implement the processes of FIGS. 3-4, to implement the example system of FIG. 2.

FIG. 5 is a block diagram of an example processor platform 500 capable of executing the instructions of FIGS. 3-4 to implement the apparatus of FIGS. 1-2. The processor platform 500 can be, for example, a server, a personal computer, a mobile phone (e.g., a cell phone), a personal digital assistant (PDA), an Internet appliance, a DVD player, a CD player, a digital video recorder, a Blu-ray player, a gaming console, a personal video recorder, a set top box, or any other type of computing device.

The system 500 of the instant example includes a processor 512. For example, the processor 512 can be implemented by one or more microprocessors or controllers from any desired family or manufacturer.

The processor 512 includes a local memory 513 (e.g., a cache) and is in communication with a main memory including a volatile memory 516 and a non-volatile memory 514 via a bus 518. The volatile memory 516 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 514 may be implemented by flash memory and/or any other desired type of memory device. Access to the main memory 514, 1816 is controlled by a memory controller.

The processor platform 500 also includes an interface circuit 520. The interface circuit 520 may be implemented by any type of interface standard, such as an Ethernet interface, a universal serial bus (USB), and/or a PCI express interface.

One or more input devices 522 are connected to the interface circuit 520. The input device(s) 522 permit a user to enter data and commands into the processor 512. The input device(s) can be implemented by, for example, a keyboard, a mouse, a touchscreen, a track-pad, a trackball, isopoint and/or a voice recognition system.

One or more output devices 524 are also connected to the interface circuit 520. The output devices 524 can be implemented, for example, by display devices (e.g., a liquid crystal display, a cathode ray tube display (CRT), a printer and/or speakers). The interface circuit 520, thus, typically includes a graphics driver card.

The interface circuit 520 also includes a communication device such as a modem or network interface card to facilitate exchange of data with external computers via a network 526 (e.g., an Ethernet connection, a digital subscriber line (DSL), a telephone line, coaxial cable, a cellular telephone system, etc.).

The processor platform 500 also includes one or more mass storage devices 528 for storing software and data. Examples of such mass storage devices 528 include floppy disk drives, hard drive disks, compact disk drives and digital versatile disk (DVD) drives. The mass storage device 528 may implement the start/stop inhibit datastore 212.

The coded instructions 532 to carry out the processes of FIGS. 2-3 may be stored in the mass storage device 528, in the volatile memory 514, in the non-volatile memory 516, and/or on a removable storage medium such as a CD or DVD.

As used herein a parameter meets a threshold when the parameter equals or exceeds the threshold. A parameter may exceed a threshold when it is greater than or less than the threshold depending on the threshold. For example, a threshold for overheating is exceeded when a monitored temperature is greater than a threshold temperature. A threshold for battery charge level is exceeded when a monitored battery charge level is less than a threshold charge level.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising: determining a machine operation path that a machine is planned to follow; determining forecast weather conditions; determining, via a processor, a projected component health parameter of a first motor of the machine based on the forecast weather conditions and the machine following the machine operation path; comparing, via the processor, the projected component health parameter to a first threshold; and issuing an alert when the projected component health parameter meets the first threshold.

2. A method as defined in claim 1, wherein the projected health parameter is associated with a starter of the first motor.

3. A method as defined in claim 1, wherein the forecast weather conditions comprise a temperature forecast for a time period during which the machine operation path is to be followed.

4. A method as defined in claim 1, wherein the machine operation path is received from a path planning tool.

5. A method as defined in claim 1, wherein the machine operation path is estimated based on prior operation of the machine.

6. A method as defined in claim 1, wherein the machine operation path comprises a route and information about terrain associated with the route.

7. A method as defined in claim 1, further comprising inhibiting automatic stoppage of the first motor when the projected component health parameter meets a second threshold.

8. A method as defined in claim 7, wherein the machine comprises a second motor that operates during stoppage of the first motor.

9. A method as defined in claim 8, wherein the second motor is an electric motor.

10. A method as defined in claim 7, wherein the second threshold is the same as the first threshold.

11. A method as defined in claim 1, wherein the first threshold is selected based on a usage setting of the machine.

12. An apparatus comprising: a path monitor to determine a machine operation path that a machine is planned to follow; an external data monitor to determine forecast weather conditions; and a start/stop inhibit controller to determine a projected component health parameter of a first motor of the machine based on the forecast weather conditions and the machine following the machine operation path, compare the projected component health parameter to a first threshold, and issue an alert when the projected component health parameter meets the first threshold.

13. An apparatus as defined in claim 12, wherein the projected component health parameter is associated with a starter of the first motor.

14. An apparatus as defined in claim 12, wherein the forecast weather conditions comprise a temperature forecast for a time period during which the machine operation path is to be followed.

15. An apparatus as defined in claim 12, wherein the machine operation path is received from a path planning tool.

16. A tangible computer readable storage medium comprising instructions that, when executed, cause a machine to at least: determine a machine operation path that a machine is planned to follow; determine forecast weather conditions; determine, via a processor, a projected component health parameter of a first motor of the machine based on the forecast weather conditions and the machine following the machine operation path; compare the projected component health parameter to a first threshold; and issue an alert when the projected component health parameter meets the first threshold.

17. A tangible computer readable storage medium as defined in claim 16, wherein the projected component health parameter is associated with a starter of the first motor.

18. A method as defined in claim 1, further including: collecting data indicative of the health of the machine from a hardware sensor attached to the machine, wherein determining the projected component health parameter is further based on the data indicative of the health of the machine; and causing a motor controller for the first motor to inhibit automatic stoppage of the first motor when the projected component health parameter meets a second threshold.

19. A method as defined in claim 1, wherein issuing the alert includes at least one of displaying an alert or outputting an audible alert.

20. An apparatus as defined in claim 12, further including: the first motor to operate the machine; a motor controller to control the first motor; and a hardware sensor attached to the machine to collect data indicative of the health of the machine, the start/stop inhibit controller further to determine the projected component health parameter based on the data indicative of the health of the machine and to cause the motor controller to inhibit automatic stoppage of the first motor when the projected component health parameter meets a second threshold.

21. An apparatus as defined in claim 20, further comprising a second motor that operates during stoppage of the first motor.

22. An apparatus as defined in claim 12, wherein issuing the alert includes at least one of displaying an alert or outputting an audible alert.

23. A tangible computer readable storage medium as defined in claim 16, wherein the instructions, when executed, cause the machine to: collect data indicative of the health of the machine from a hardware sensor attached to the machine, wherein determining the projected component health parameter is further based on the data indicative of the health of the machine; and cause a motor controller for the first motor to inhibit automatic stoppage of the first motor when the projected component health parameter meets a second threshold.

24. A tangible computer readable storage medium as defined in claim 16, wherein issuing the alert includes at least one of displaying an alert or outputting an audible alert.

* * * * *